United States Patent [19]
Van Sickel et al.

[11] 3,716,451
[45] Feb. 13, 1973

[54] NUCLEAR REACTOR POWER PLANT STRUCTURAL SUPPORT SYSTEM

[75] Inventors: Alfred L. Van Sickel, East Weymouth; Errol S. Mitchell, Dorchester; Gianfranco Rigamonti, Cambridge, all of Mass.

[73] Assignee: Stone & Webster Engineering Corporation, Boston, Mass.

[22] Filed: Nov. 30, 1970

[21] Appl. No.: 93,687

[52] U.S. Cl. .................. 176/65, 176/38, 176/60, 176/87, 165/81
[51] Int. Cl. .................. G21c 15/22, G21c 21/00
[58] Field of Search .............. 176/37, 38, 60, 65, 87; 165/67, 68, 81

[56] References Cited

UNITED STATES PATENTS

| | | | |
|---|---|---|---|
| 3,185,631 | 5/1965 | Long et al. | 176/65 |
| 3,192,121 | 6/1965 | Challender et al. | 176/87 |
| 3,236,295 | 2/1966 | Yurko | 165/67 |
| 3,367,839 | 2/1968 | Chinaglia | 176/87 |
| 3,395,076 | 7/1968 | Ruppen, Jr. | 176/38 |
| 3,528,884 | 9/1970 | Collier et al. | 176/65 |

Primary Examiner—Carl D. Quarforth
Assistant Examiner—Roger S. Gaither
Attorney—Morgan, Finnegan, Durham & Pine

[57] ABSTRACT

A structural support system for the steam generators and reactor coolant circulating pumps of a nuclear power plant in which each steam generator is carried in a lower frame support mounted on linear slides and also is supported by an upper ring to which there is secured four equi-spaced hydraulic snubber assemblies mounted to the charging floor of the power plant at perpendicular directions to each other. Each reactor coolant pump is carried in a pivotally mounted frame support adjacent its associated steam generator. Hydraulic snubber assemblies extend between each steam generator and its associated reactor coolant pump and also between the reactor shield wall and each of the steam generators and reactor coolant pumps.

10 Claims, 5 Drawing Figures

INVENTORS
ALFRED L. VAN SICKEL
ERROL S. MITCHELL
GIANFRANCO RIGAMONTI by Morgan, Finnegan, Durham & Pine
ATTORNEYS

INVENTORS
ALFRED L. VAN SICKEL
ERROL S. MITCHELL
GIANFRANCO RIGAMONTI by Morgan, Finnegan, Durham & Pine
ATTORNEYS

NUCLEAR REACTOR POWER PLANT STRUCTURAL SUPPORT SYSTEM

BACKGROUND AND OBJECTS OF THE INVENTION

This invention relates generally to nuclear reactor power plants utilizing a high pressure, high temperature coolant and/or moderator, such as water, which is circulated through one or more coolant loops extending between the reactor vessel, a steam generator and a circulating pump and relates more particularly to certain new and useful improvements in structural support system for such nuclear reactor plants.

The pressurized water nuclear reactor system is well known. In a large scale facility, three or four steam generators may be associated with the reactor and, hence, an equal number of coolant loops are provided, in each of which the cooling water under pressure is pumped through the reactor core to a heat exchanger for the generation of steam (steam generator). Current design practice requires that both the reactor vessel and the primary coolant system be enclosed within a vapor containment structure designed to contain the maximum pressure build-up which might be obtained as a result of a rupture or other accident involving the primary coolant barrier, causing sudden vaporization of the water and permitting the escape of radioactive materials. It is also customary to support the reactor vessel within a primary shield wall and to support the primary coolant system equipment between the reactor shield wall and a secondary shield wall spaced inwardly from the outer containment vessel.

The provision of a totally safe structural support system for the equipment of the primary coolant system of the aforedescribed pressurized water nuclear reactor power plant is particularly difficult where it must withstand not only (1) the normal weight and operating loads of the equipment but also the simultaneous occurrence of (2) an earthquake and (3) a rupture in the pressurized fluid system of the reactor, including the possibility of a longitudinal pipe split in either a horizontal or vertical section of the piping, and yet meet the practical requirements of serviceability and economics, such as convenient installation, freedom from maintenance and capability of construction at low cost.

Heretofore, structural support systems for the primary coolant system equipment of a nuclear reactor power plant either have not been capable of withstanding all the forces which may be postulated upon a rupture in the pressurized fluid system or have been deficient in one or more of the areas of servicing or economic practicality.

It is therefore the general object of this invention to provide a new and improved structural support system for nuclear reactor power plants.

A more particular object of this invention is to provide a new and improved structural support system for the primary coolant equipment of a nuclear reactor power plant utilizing a high pressure, high temperature coolant and/or moderator, which is circulated through one or more coolant loops extending between the reactor vessel, a steam generator and a circulating pump.

Another object of this invention is to provide a new and improved structural support system for the primary coolant system equipment of a nuclear reactor power plant which has improved safety characteristics and structural stability over previously known structural support systems, and yet which is economically practical to construct and maintain.

Another object of this invention is to provide a new and improved structural support system for the steam generators and circulating pumps in a pressurized primary coolant system for a nuclear reactor power plant which supports not only the weight and normal operating loads of each steam generator and reactor coolant circulating pump but also withstands all forces which may be caused by the simultaneous occurrence of an earthquake and a pipe rupture in the pressurized fluid system for the reactor, whether the rupture is a double-ended pipe break or a longitudinal pipe split in either a horizontal or vertical section of the system piping.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved structural support system for nuclear power reactors utilizing a high pressure, high temperature coolant and/or moderator, such as water, which is circulated through one or more coolant loops between the reactor vessel and a steam generator and circulating pump.

In accordance with the purposes and objects of the invention, the structural support system supports the weight and normal operating loads of the steam generator and reactor coolant recirculating pump of each coolant loop and also withstands all forces which may be caused by the simultaneous occurrence of an earthquake and a rupture in the pressurized fluid system for the reactor, whether as a double-ended pipe break or a longitudinal pipe split in either a horizontal or vertical section of the system piping.

As preferably embodied, the structural support system of the present invention includes, for each coolant loop, a lower support frame and an upper support ring for the steam generator. The lower support frame is mounted on linear slides and the upper support ring is secured to the charging floor of the power plant by four equi-spaced hydraulic snubber assemblies mounted at perpendicular directions to each other. Each reactor coolant pump is carried in a pivotally mounted frame support adjacent the associated steam generator. Hydraulic snubber assemblies extend between the support frames for each steam generator and its associated reactor coolant pump and also extend between the reactor vessel shield wall and each of the steam generator and reactor coolant pump support frames.

It will be understood that the foregoing general description and the following detailed description as well are exemplary and explanatory of the invention but are not restrictive thereof.

DESCRIPTION OF THE PREFERRED EMBODIMENT

Figure 1:
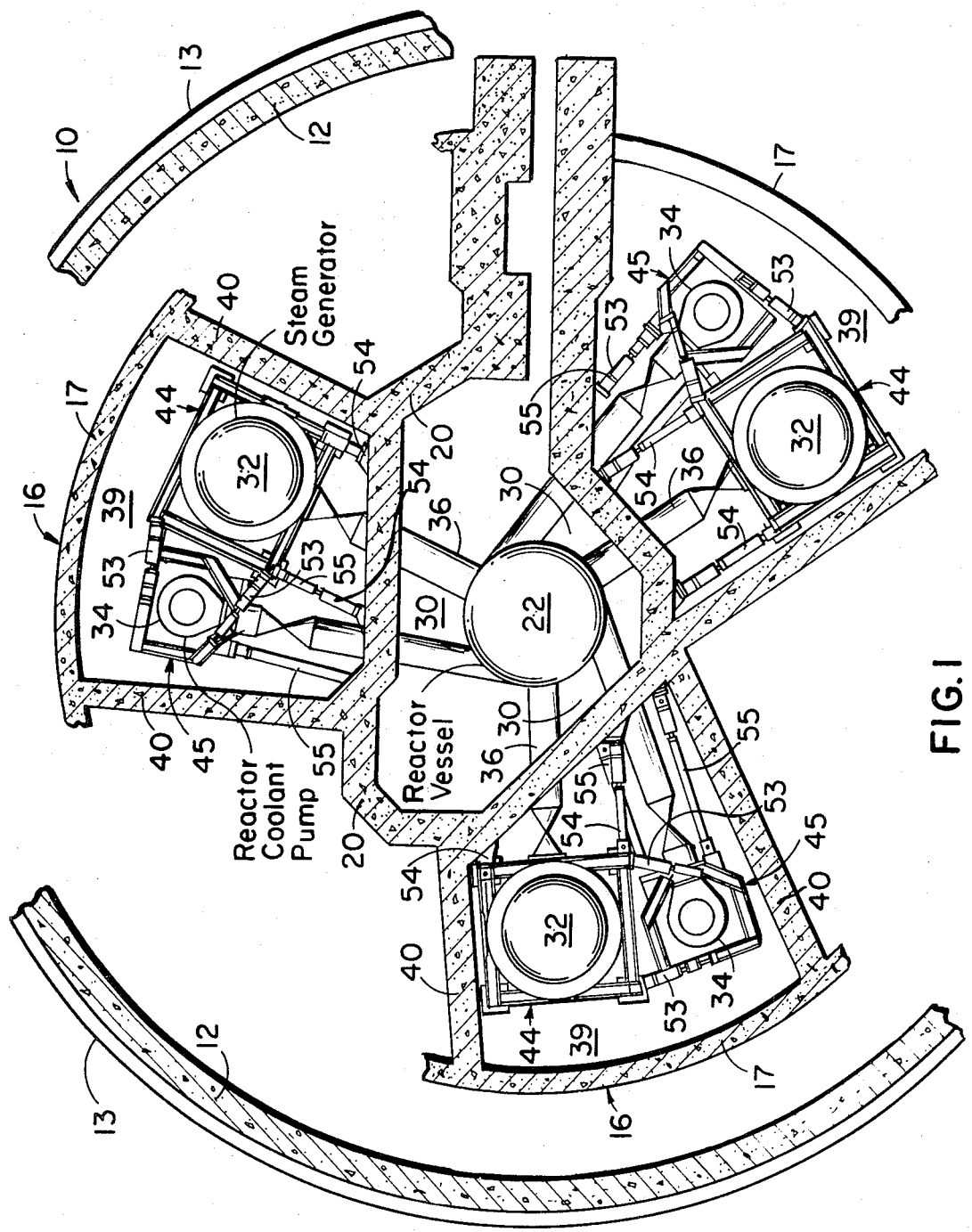
FIG. 1 is a fragmentary view in top plan, partly in section, of an exemplary arrangement for a pressurized water nuclear reactor plant having three steam generators and reactor coolant pumps surrounding the reactor vessel, wherein each of the steam generators and reactor coolant pumps are supported in accordance with the structural support system of the invention, the view illustrating the lower frame supports and the location of the hydraulic snubber assemblies secured between each steam generator and its associated reactor coolant pump and also between the reactor vessel shield wall and each of the steam generators and reactor coolant pumps.

Referring now more particularly to the accompanying drawings, there is shown an illustrative example of a pressurized water nuclear reactor power plant, indicated generally by reference numeral 10, to which the structural support system of the invention may be advantageously applied.

The illustrative nuclear reactor power plant 10 suitably includes a cylindrically-shaped outer containment vessel 12 mounted onto a circular foundation or mat 13, and having a hemispherical dome portion 14 and a suitable access opening 15. A nuclear reactor housing structure 16 is suitably provided within the outer vessel 12, extending vertically from the foundation 13 into the upper region of the space enclosed by the outer containment vessel 12.

Nuclear reactor housing structure 16 includes an outer circumferentially extending wall 17 spaced inwardly from outer containment vessel 12 so as to form a secondary shield and to also support a suitable polar crane 18 on its top circumferentially extending rim. Spaced inwardly of wall 17 is a primary shield wall 20 surrounding the nuclear reactor vessel 22. The generally annular space between walls 17 and 20 is suitably divided into vertical levels by floors 24 and 25, more fully described hereinafter.

The nuclear reactor plant is located within the space enclosed by the secondary shield wall 17 and comprises a suitable reactor vessel 22 containing a reactor core and, in the exemplary embodiment herein shown and described, three primary coolant loops 30. Each primary loop 30 includes a heat exchanger such as steam generator 32, a reactor or primary coolant circulating pump 34, and primary coolant conduits 36. As is well known to those in the art of nuclear reactor technology, in operation the primary coolant is heated within the reactor vessel 22, flows from the reactor to the steam generator 32 where a portion of its heat is exchanged to a secondary fluid, flows from the steam generator 32 to the reactor coolant pump 34, and then returns to the reactor vessel 22 where the coolant is again heated by the reactor core and the cycle repeated.

The reactor shield wall 20 cooperates with the secondary shield wall 17 to form an annular loop compartment 38 between floors 24 and 25, which is divided into separately enclosed cubicles as shown at 39, by a plurality of radially extending walls 40, each cubicle 39 housing the steam generator and reactor coolant pump of each primary coolant loop 30.

Figure 2:
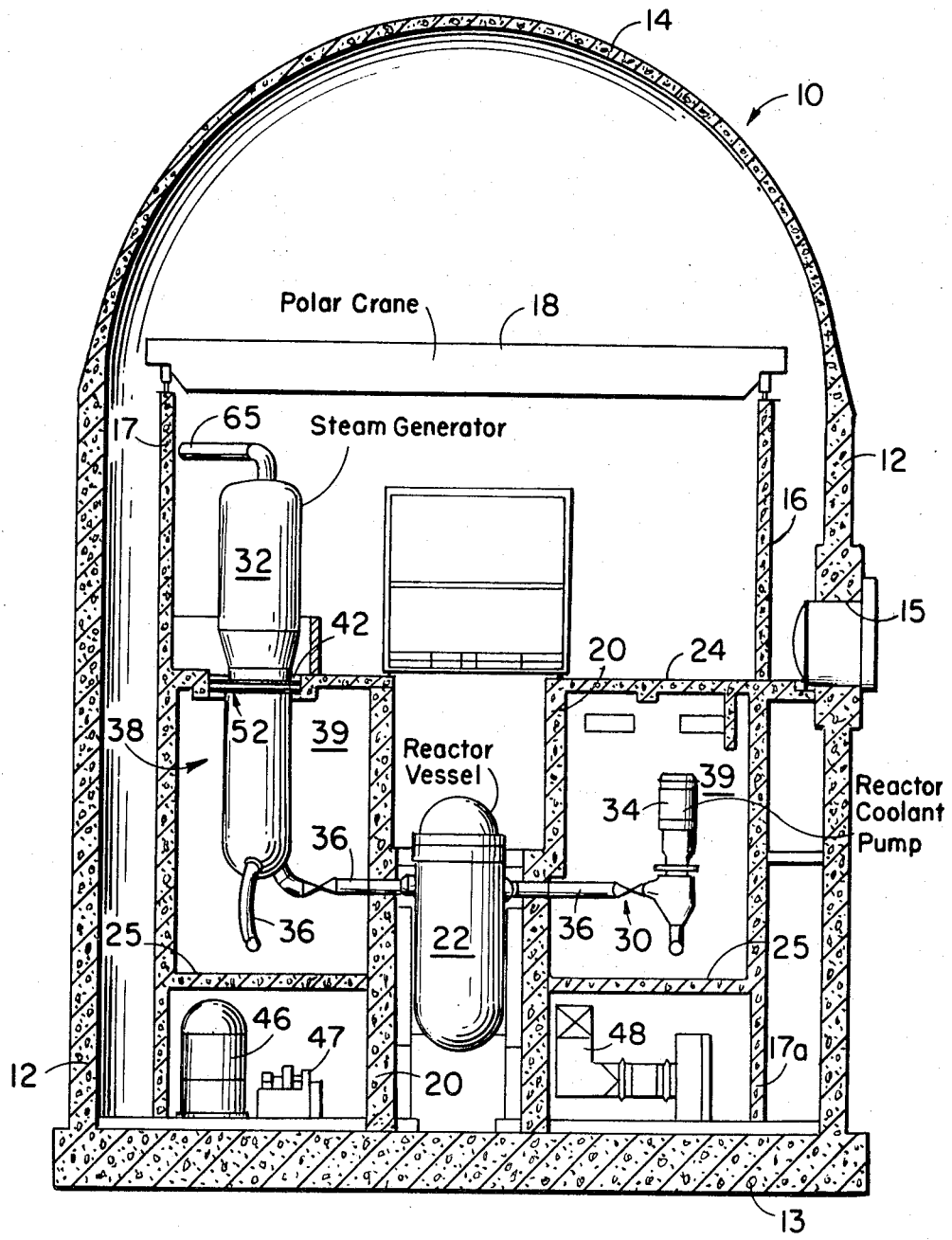
FIG. 2 is a vertical sectional view, partly in elevation, of the pressurized water nuclear reactor plant shown in FIG. 1 with parts removed to show the location of the steam generators and reactor coolant pumps with respect to the reactor vessel.

The upper floor 24 extends horizontally across the top of the loop compartment 38 and comprises the charging floor of the power plant for servicing reactor vessel 22. Steam generator openings 42, more fully described hereinafter, are provided in the charging floor 24 to allow a portion of each steam generator 32 to pass therethrough. Intermediate floor 25 serves to support the lower support frames 44, 45, respectively, for the steam generators and reactor coolant pumps, as more fully described hereinafter. Intermediate floor 25 and foundation 13 form a lower annular compartment which suitably serves to house other auxiliary equipment for the power plant, such as accumulators, filtration equipment and an air recirculating fan, diagrammatically illustrated at 46, 47 and 48 in FIG. 2.

In accordance with the invention, support means are provided for supporting the weight and normal operating loads of the steam generator and reactor coolant circulating pump of each primary loop and also for withstanding all forces caused by the simultaneous occurrence of an earthquake and a pipe rupture, whether as a double-ended break or a longitudinal split in either a horizontal or vertical section of the pipe.

Figure 3:
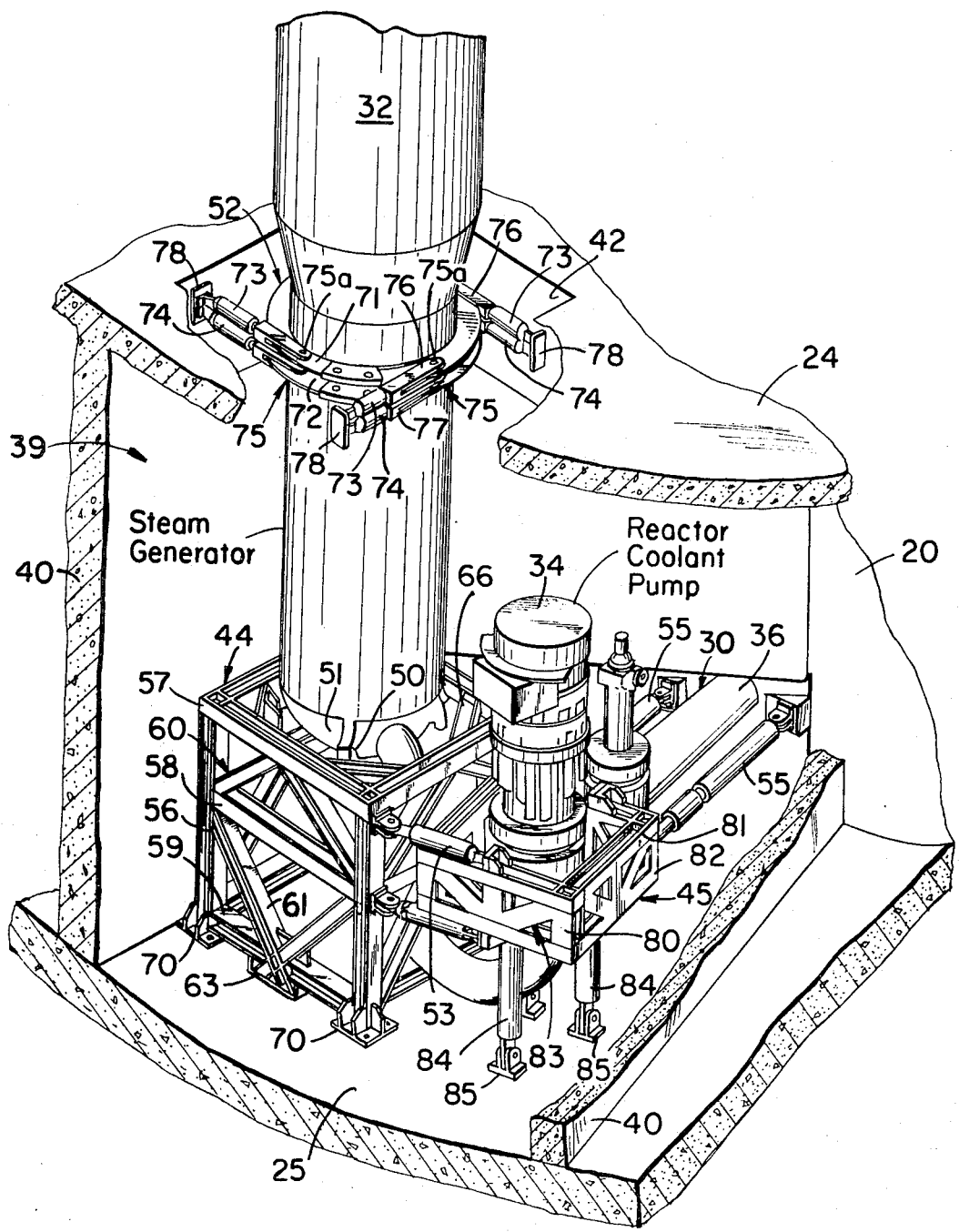
FIG. 3 is an enlarged, fragmentary, perspective view of one of the cubicle rooms of the plant shown in FIG. 1 housing a steam generator and reactor coolant pump, the view illustrating the upper support ring and lower support frame for the steam generator, the support frame for the reactor coolant pump and the location and arrangement of the hydraulic snubber assemblies.
Figure 4:
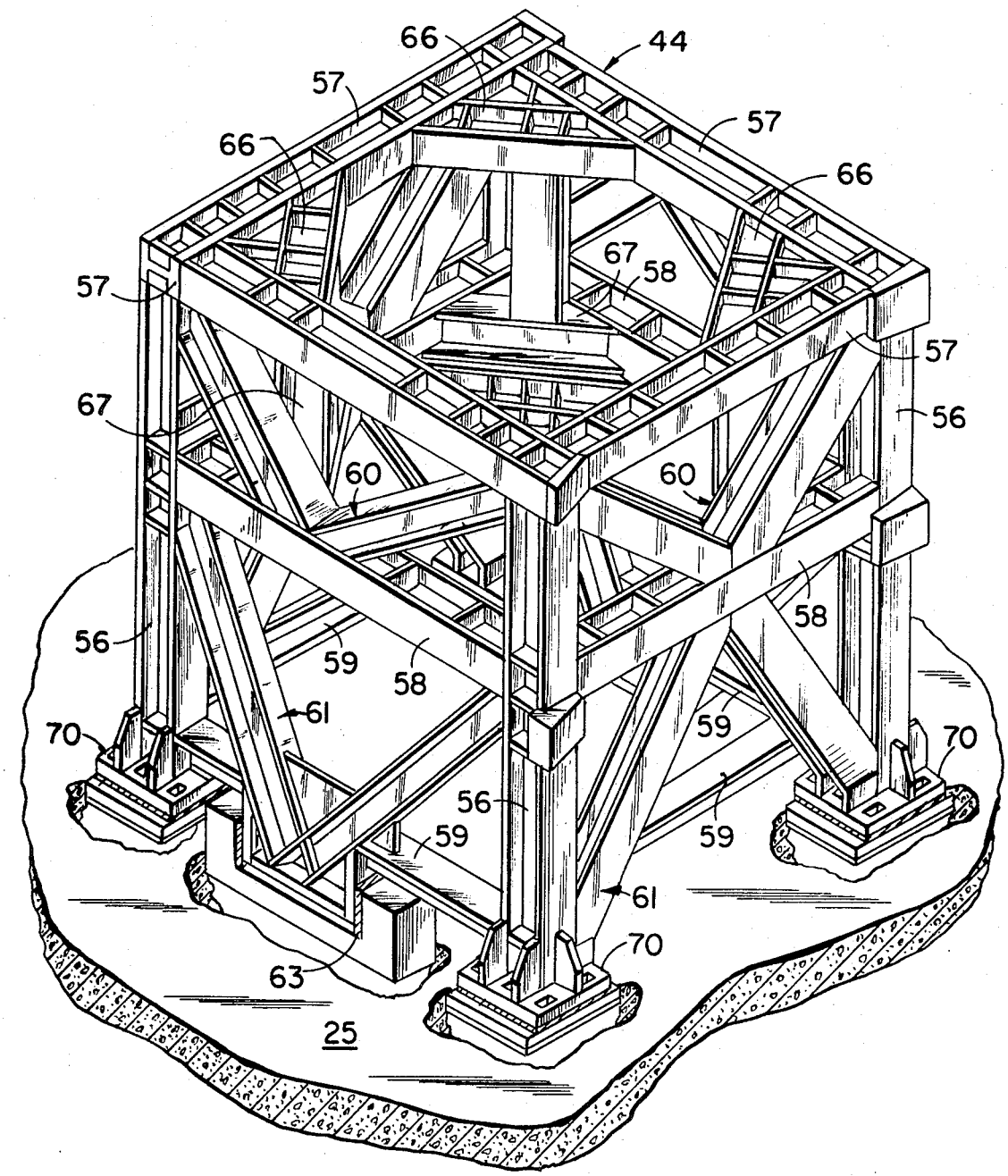
FIG. 4 is an enlarged perspective view of the lower support frame for each of the steam generators shown in FIGS. 1 and 2.

To this end, referring particularly to FIG. 3, each steam generator 32 is mounted in a lower support frame 44 by means of four equi-spaced support pads such as shown at 50 extending radially outwardly from the steam generator bottom head 51 and is also secured at an upper level to the charging floor 24 by means of a support ring 52. Each reactor coolant pump is supported in a pivotally mounted frame 45 adjacent the associated steam generator 32. Hydraulic snubber assemblies 53 extend between each steam generator and associated reactor coolant pump lower support frames 44, 45 and also extend between the reactor shield wall 20 and each of the steam generator and reactor coolant pump support frames, as shown at 54 and 55, respectively.

The hydraulic snubber assemblies 53, 54 and 55 may each suitably include a hydraulic snubber cylinder of a construction such as that commercially available from Bergen-Paterson Pipe-support Corporation, 10 Forbes Road, Braintree Branch, Boston, Mass.

As here preferably embodied, the steam generator lower support frame 44 is a generally square structure comprised of four outer vertical posts 56 joined in each of upper, intermediate, and lower horizontal planes by horizontally extending beam members 57, 58 and 59, respectively. Additional vertical support is provided for the vertical and horizontal beams by V-shaped, or inverted V-shaped, truss assemblies mounted between each adjacent pair of vertical beams and between adjacent horizontal beams 57, 58 and 58, 59, as for example is shown at 60 and 61.

Figure 5:
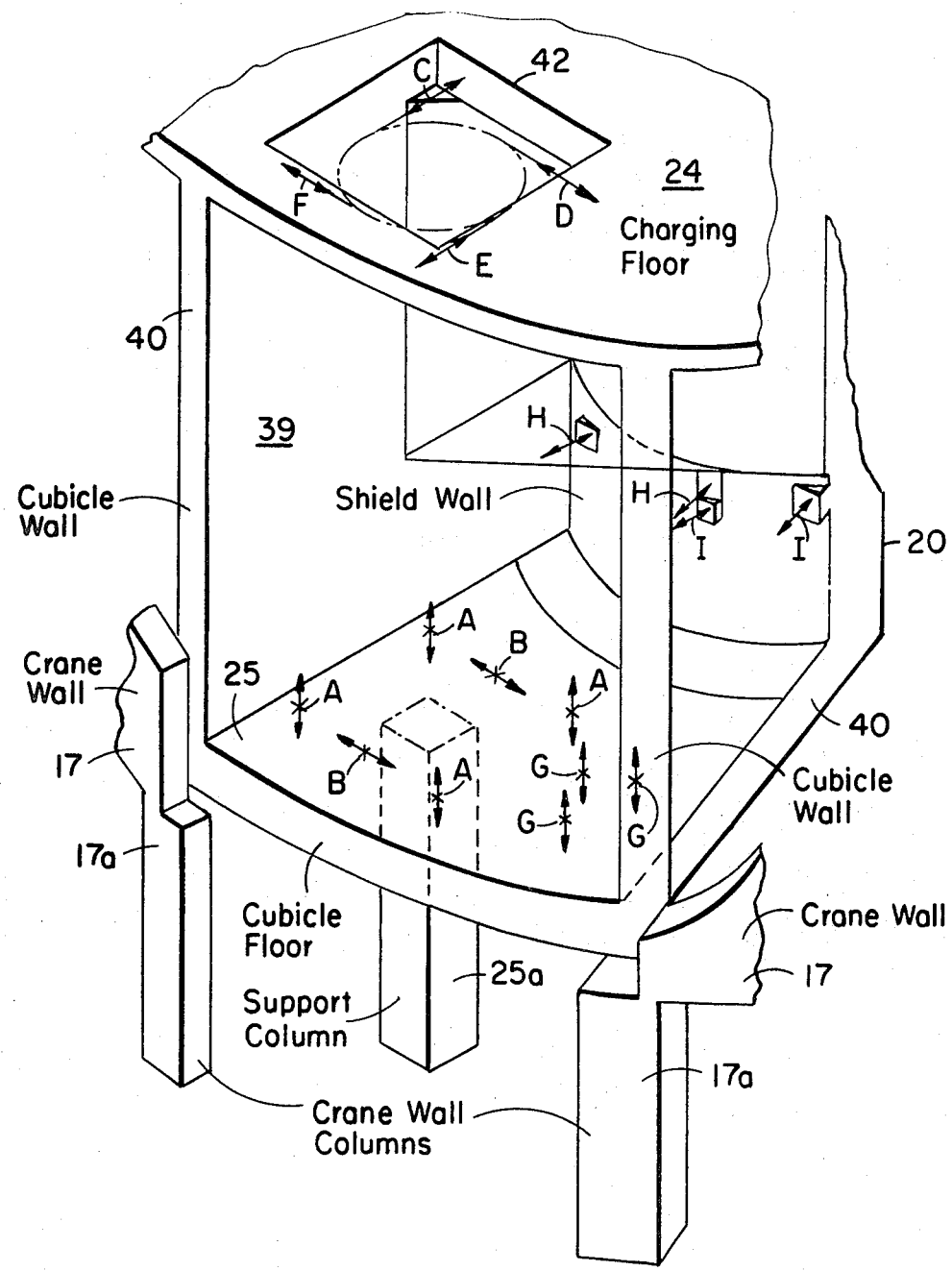
FIG. 5 is a fragmentary diagrammatic view of a cubicle room of the plant shown in FIG. 1, illustrating the paths of postulated load forces as they are directed into the power plant support structure.

It will be understood that the V-shaped trusses 60, 61 provide substantially identical support whether upright or inverted, and the particular orientation may be selected on any suitable basis, although the primary factor in such selection is the entry and exit points of the primary coolant piping 36 (see FIG. 2) leading to and from the steam generator 32 and the isolation of vertical and horizontal forces into the cubicle floor 25 as indicated by arrows A and B in FIG. 5.

Thus, as shown in FIG. 5, vertical support for each steam generator 32 is provided where indicated by arrows A. Finally, suitable corner braces 66, 67 are provided at the upper and intermediate horizontal levels, respectively, of the frame 44 for receiving the support pads 51 of the steam generator and providing additional horizontal support for the horizontal beams 57 and 58.

Advantageously, and as here preferably embodied, each steam generator lower support frame 44 is suitable mounted on linear slide assemblies 63, 70 which are attached to the cubicle floor 25. Linear slide assemblies 70 may suitable be of a lubricated bearing plate construction such as that commercially available from Lubrite Division of Merriman, Inc., Hingham, Mass., and permit linear motion of the support frame 44 in the horizontal direction as indicated by arrows H (FIG. 5), as is more fully described hereinafter.

The steam generator upper support ring 52, as preferably embodied, comprises a pair of vertically spaced annular flanges 71, 72 extending circumferentially about the steam generator cylindrical vessel 32. Advantageously, and as preferably embodied, at each of four equally spaced points 75 about support ring 52, a pair of hydraulic snubber cylinders 73, 74 are pivotally mounted to flanges 71, 72 by a pin member 75a extending through suitable openings in the flanges and the open end portions of clevis units 76, 77. Each pair of cylinders 73, 74 are fixedly secured at their opposite ends to a plate 78 which in turn is affixed to the charging floor 24. Alternatively, it will be understood that only a single hydraulic snubber cylinder and clevis unit may be mounted to each point 75 on support ring 52. Hydraulic snubber cylinders 73, 74 may suitably be of a similar construction as that of assemblies 53, 54, 55. It will be apparent from the foregoing that the steam generator upper support ring 52 transmits horizontal forces from the steam generator through four oppositely directed tangential load trains to the reinforced concrete charging floor 24, as indicated by arrows C, D, E and F in FIG. 5.

The support frame 45 for the reactor coolant circulating pump 34 advantageously comprises a generally square structure having four vertical posts 80 joined by upper and lower horizontal beams 81, 82 which are suitably reinforced on each side by truss assemblies 83. The support frame is located above the cubicle floor by three pin-ended columns 84 mounted in pivotal supports 85 secured to the cubicle floor 25, thereby providing vertical support as indicated by the arrows G (FIG. 5) for the reactor coolant pump, while allowing free movement in the horizontal plane, as indicated by the superimposed X's on the arrows G (FIG. 5). Pivotal motion is obtained at each end of the columns 84 by the use of spherical ball bushings installed between the clevis pin of the base supports 85 and the lug end of the columns.

It will be seen that the aforedescribed structural support system transmits forces in the following manner. The upper support ring 52 transmits horizontal forces from the steam generator 32 through four tangential load trains as shown by arrows C, D, E and F to the reinforced concrete charging floor 24. The charging floor 24 in turn transmits horizontal forces C, D, E and F to the reactor shield wall 20, the crane wall 17, and the cubicle walls 40, where, through shearing actions, they are further transmitted downwardly to the foundation mat 13. By equipping the tangential load trains from the upper support ring 52 to the charging floor 24 with hydraulic snubbing cylinders, limited slow motion of the steam generator 32 is permitted to allow for thermal expansion of the reactor coolant piping 36 from the reactor vessel 22 to the steam generator. However, the cylinders are locked by a suitable hydraulic flow control device to resist suddenly applied forces which occur from earthquake or pipe rupture conditions.

The steam generator is suitably mounted to the lower support frame 44 to allow for radial thermal expansion of the four support pads 51 by allowing sufficient radial clearance when installed prior to heat-up. Lubricated bearing plates (not shown) between the steam generator support pads 50 and the corner braces 66 of the lower support frame 44 limit friction forces during thermal expansion of the steam generator. As previously described, frame 44 is attached to the cubicle floor 25 with linear slides 63, 70 and to the reactor shield wall 20 with hydraulic snubbing assemblies 54. The linear slides and hydraulic snubbing assemblies permit motion for thermal expansion of the reactor coolant piping 36 from the reactor vessel 22 to the steam generator 32. The slide assemblies 63 react to horizontal shearing forces normal to the direction of this expansion, illustrated by arrows B. The slide assemblies 70 transmit only vertical forces from the support frame 44 to the cubicle floor 25, indicated by arrows A. The hydraulic snubbing assemblies 54 also transmit suddenly applied horizontal forces from the support frame 44 to the reactor shield wall 20, as indicated by arrows H in FIG. 5.

The reactor coolant pump is suitably mounted in support frame 45 to permit radial thermal expansion of the pump base by allowing sufficient radial clearance when installed prior to heat-up. Pin-ended columns 84 provide vertical support for frame 45, illustrated by arrows G, while allowing free movement in the horizontal plane indicated by the X's on arrows G. Lateral support for pump 34 is provided by hydraulic snubbing assemblies 53 located between the pump support frame 45 and the steam generator lower support frame 44, and also by hydraulic snubbing assemblies 55 located between the pump support frame 45 and the reactor shield wall 20. Snubbing assemblies 53 and 55 permit slow horizontal movement of the pump for thermal expansion of reactor coolant piping 36 between the pump and the steam generator and reactor, but are locked by a suitable hydraulic flow control device to resist suddenly applied forces from earthquake and pipe rupture conditions, illustrated by arrows I in FIG. 5.

The vertical forces applied to the cubicle floor 25 are directed outwardly in the reinforced concrete to the edges of the floor where they are transmitted to the surrounding walls. The vertical forces transmitted to the cubicle walls 40 are in turn directed outwardly to the crane wall columns 17a and to the shield wall 20 where they are carried downwardly to the mat 13. Advantageously, a square vertical column 25a may be provided between the cubicle floor 25 and the mat 13 directly beneath the steam generator so as to provide an additional load path which transmits some of the vertical forces directly from the cubicle floor 25 to the mat 13.

Horizontal forces applied to the cubicle floor 25 act as a torsional moment about the centerline of the reactor vessel 22. This moment is transmitted to the mat 13 by torsional shearing forces in the shield wall 20 and by shear forces in the crane wall columns 17a and in the column 25a below the steam generator 32.

As will be known to those in the art of nuclear reactor technology, a root-mean-square combination of modal responses is taken as the basis for calculating the effect of an earthquake. As previously discussed, two types of piping ruptures are considered in the structural support system of the present invention: (a) a double-ended break, or (b) a longitudinal split on either a horizontal or vertical section of the system piping. These failures are assumed to occur in either the reactor coolant piping 36 or the main steam piping 65. It will be appreciated that the values for these postulated pipe thrusts have previously been analyzed for preliminary sizing of structural members and connections and are listed in the following Table 1. A dynamic analysis is subsequently performed using forces calculated as a function of time based on two-phase flow at the pipe rupture and other functions based on hydraulic flow and shock waves within the coolant loop as a result of such a pipe rupture.

Table 1

Static Design Loads For Pipe Rupture

| Type of break and location | Design load (kips) |
|---|---|
| Cold leg guillotine* | 1,469 |
| Cold leg split** | 2,524 |
| Pump suction guillotine | 1,600 |
| Pump suction split | 1,708 |
| Hot leg guillotine | 2,140 |
| Hot leg split | 3,045 |
| Main Steam guillotine | 1,917 |
| Main steam split | 1,917 |

*A break extending generally transversely to the longitudinal axis of the pipe
**A break extending longitudinally parallel to the axis of the pipe The foregoing pipe rupture loads include a value of two for the dynamic load factor. Accordingly, it will be understood that the material and dimensions of the supporting structures of the present invention may be selected by appropriate stress analysis based upon the loading obtained with the simultaneously combined force of an earthquake and a rupture in the primary coolant or main steam piping. Advantageously, all stresses are maintained within 90 percent of the minimum yield point of the structural material used for ease of calculation.

The invention in its broader aspects is not limited to the specific embodiment herein shown and described but departures may be made therefrom without departing from the principles of the invention and without sacrificing its chief advantages.

What is claimed is:

1. In a nuclear reactor power plant utilizing a pressurized coolant system and having at least one primary coolant loop including a steam generator and a coolant circulating pump connected by a piping system to the reactor vessel, and wherein the reactor vessel is contained within a primary shield wall and the steam generator and coolant circulating pump are mounted between the reactor shield wall and a secondary shield wall, structural support means for the steam generator of said at least one primary coolant loop, including:

lower frame support means and upper ring support means, said lower frame support means including linear slide mounting means permitting limited motion in a horizontal direction generally parallel to the longitudinal axis of the primary coolant piping extending between said reactor vessel and said steam generator but resisting applied forces occurring in a direction normal to the direction of limited horizontal motion, and said upper ring support means including first hydraulic snubber cylinder means permitting limited slow motion in at least one horizontal direction but resisting suddenly applied forces in said at least one horizontal direction.

2. Apparatus as claimed in claim 1, wherein said structural support means includes second hydraulic snubber cylinder means extending laterally between the reactor shield wall and said steam generator lower frame support means, thereby permitting limited slow horizontal motion between said steam generator frame support means and said reactor shield wall but transmitting suddenly applied horizontal forces between said steam generator frame support means and said reactor shield wall to the reactor shield wall.

3. Apparatus as claimed in claim 1, including frame support means for said reactor coolant circulating pump, said circulating pump frame support means including pivotal mounting means permitting free horizontal movement of said circulating pump frame support means; and third hydraulic snubber cylinder means extending laterally between the steam generator lower frame support means and said coolant circulating pump frame support means, thereby permitting limited slow horizontal motion between said steam generator and said circulating pump frame support means but resisting suddenly applied horizontal forces therebetween.

4. Apparatus as claimed in claim 3, including fourth hydraulic snubber cylinder means extending laterally between the reactor shield wall and said coolant circulating pump frame support means, thereby permitting limited slow horizontal motion between said circulating pump frame support means and said reactor shield wall but transmitting suddenly applied horizontal forces between said circulating pump frame support means and said reactor shield wall.

5. Apparatus as claimed in claim 1, wherein said first hydraulic snubber cylinder means permits limited slow motion in four mutually perpendicular horizontal directions but resists suddenly applied forces in any of said four mutually perpendicular horizontal directions.

6. A structural support system as claimed in claim 1, wherein said steam generator lower frame support means includes
a plurality of vertical corner post members,
a plurality of horizontal beam members joined between each adjacent pair of said vertical post members at a plurality of spaced horizontal planes so as to form a frame structure having a plurality of sides,
truss means extending between each of said horizontal beam members and adjacent pairs of corner post members providing additional horizontal and vertical support to said frame structure, and
corner brace means on at least one horizontal plane extending between the adjacent end portions of each pair of horizontal beam members joined to a vertical post member therebetween, providing additional horizontal support for said horizontal beam members and serving to transmit forces from the steam generator to the lower support frame.

7. In a nuclear reactor power plant utilizing a pressurized coolant system and having at least one primary coolant loop including a steam generator and a coolant circulating pump connected by a piping system to the reactor vessel, and wherein the reactor vessel is contained within a primary shield wall and the steam generator and coolant circulating pump are mounted between the reactor shield wall and a secondary shield wall, a structural support system for the steam generator and coolant circulating pump of said at least one primary coolant loop, including:
lower frame support means and upper ring support means for said steam generator,
said lower frame support means including linear slide mounting means permitting limited motion in a horizontal direction generally parallel to the longitudinal axis of the primary coolant piping extending between said reactor vessel and said steam generator but resisting applied forces occurring in a direction normal to the direction of limited horizontal motion, and
said upper ring support means including first hydraulic snubber cylinder means permitting limited slow motion in four mutually perpendicular horizontal directions but resisting suddenly applied forces in any of said horizontal directions;
frame support means for said reactor coolant circulating pump,
said circulating pump frame support means including pivotal mounting means permitting free horizontal movement of said circulating pump frame support means;
second hydraulic snubber cylinder means extending laterally between the reactor shield wall and said steam generator lower frame support means, thereby permitting limited slow horizontal motion between said steam generator frame support means and said reactor shield wall but transmitting suddenly applied horizontal forces between said steam generator frame support means and said reactor shield wall to the reactor shield wall;
third hydraulic snubber cylinder means extending laterally between the steam generator lower frame support means and said coolant circulating pump frame support means, thereby permitting limited slow horizontal motion between said steam generator and said circulating pump frame support means but resisting suddenly applied horizontal forces therebetween; and
fourth hydraulic snubber cylinder means extending laterally between the reactor shield wall and said coolant circulating pump frame support means, thereby permitting limited slow horizontal motion between said circulating pump frame support means and said reactor shield wall but transmitting suddenly applied horizontal forces between said circulating pump frame support means and said reactor shield wall to the reactor shield wall.

8. A structural support system as claimed in claim 7, wherein
said linear slide mounting means for said steam generator lower frame support means is mounted to an intermediate, horizontal reinforced concrete floor, and
said first snubber cylinder means of said upper support ring means is mounted to an upper horizontal reinforced concrete floor,
each of said intermediate and upper horizontal reinforced concrete floors being secured to and extending between said reactor shield wall and said secondary shield wall,
whereby vertical and horizontal forces applied to said intermediate and upper horizontal reinforced concrete floors are transmitted to both the reactor shield wall and the secondary shield wall and thereafter directed downwardly to the plant foundation.

9. A structural support system as claimed in claim 8, wherein
said upper ring support means includes
a pair of vertically spaced annular flange members extending circumferentially about the steam generator vessel, and
clevis means pivotally mounted to said flange members at equi-spaced, 90° intervals; and wherein
said first hydraulic snubber cylinder means includes hydraulic snubber cylinder units mounted at one end to the free end of each of said claims means and mounted at the other end to said upper horizontal reinforced concrete floor.

10. A structural support system as claimed in claim 8, including a vertical support column extending between said intermediate horizontal reinforced concrete floor and the plant foundation and positioned directly beneath said steam generator.

* * * * *

PO-1050
(5/69)

UNITED STATES PATENT OFFICE
CERTIFICATE OF CORRECTION

Patent No. 3,716,451      Dated February 13, 1973

Inventor(s) Alfred L. Van Sickel et al

It is certified that error appears in the above-identified patent and that said Letters Patent are hereby corrected as shown below:

Claim 9, line 66, "each of said <u>claims</u> means" should read --each of said <u>clevis</u> means--.

Signed and sealed this 7th day of August 1973.

(SEAL)
Attest:

EDWARD M. FLETCHER, JR.
Attesting Officer

RENE D. TEGTMEYER
Acting Commissioner of Patents